DISK ASSEMBLY AND METHOD OF FABRICATING SAME
Filed Feb. 23, 1968 3 Sheets-Sheet 1
FIG. 1
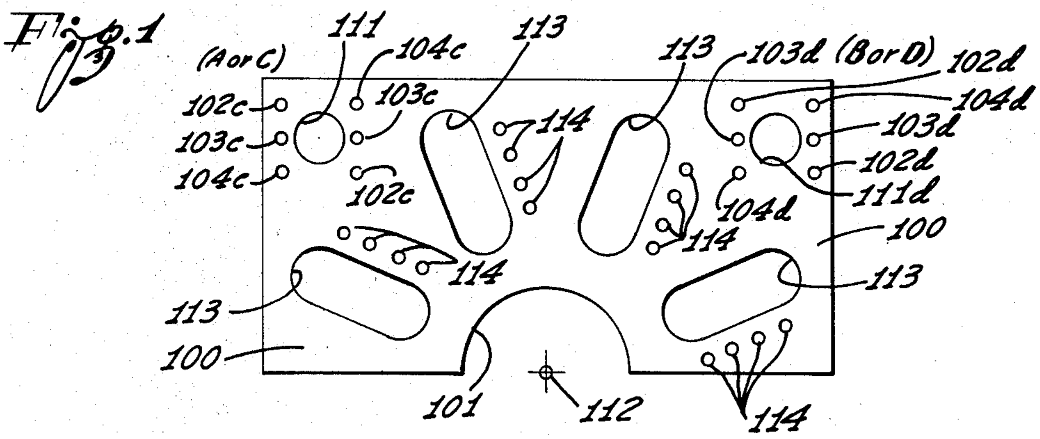
FIG. 2
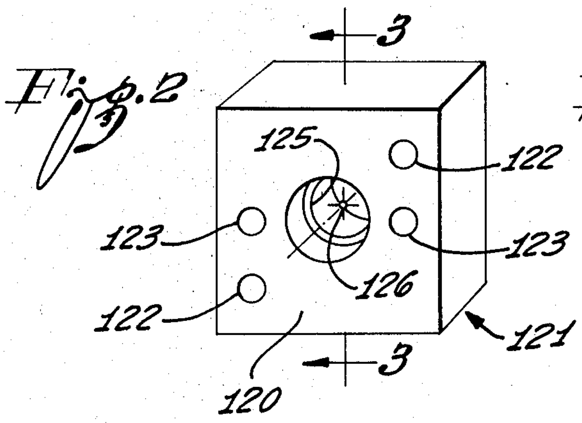
FIG. 3
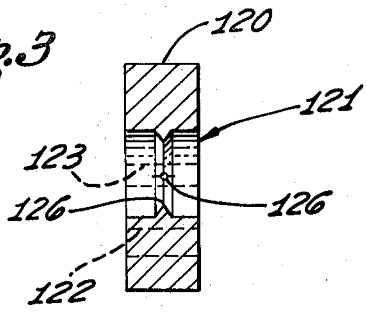
FIG. 5 (Tool)
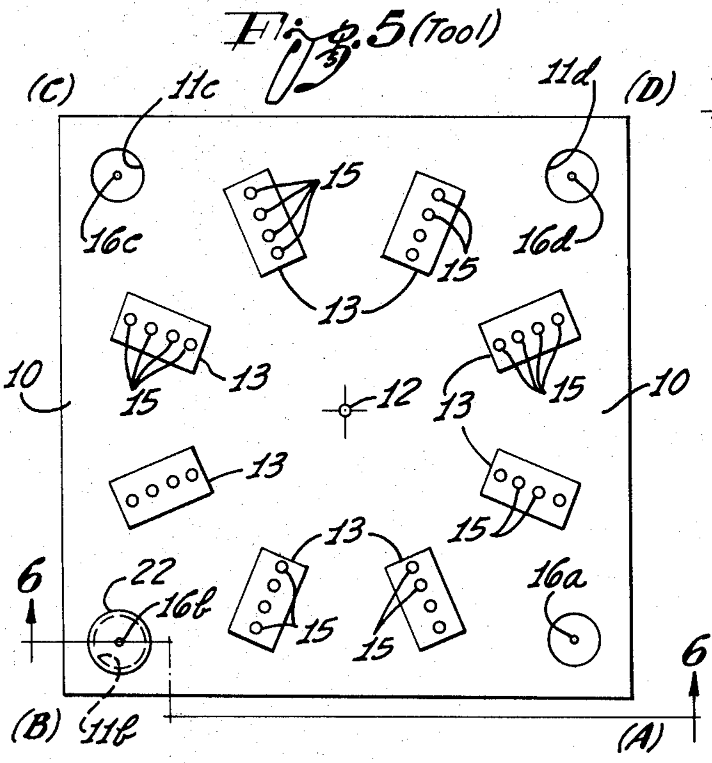
FIG. 4
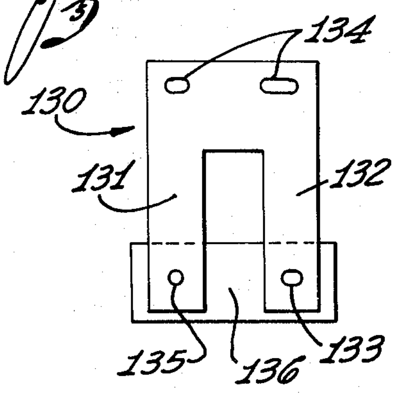
INVENTOR:
John A. Felts
By Smyth, Roston & Pavitt
ATTORNEYS Oct. 27, 1970 J. A. FELTS 3,535,777
DISK ASSEMBLY AND METHOD OF FABRICATING SAME
Filed Feb. 23, 1968 3 Sheets-Sheet 2
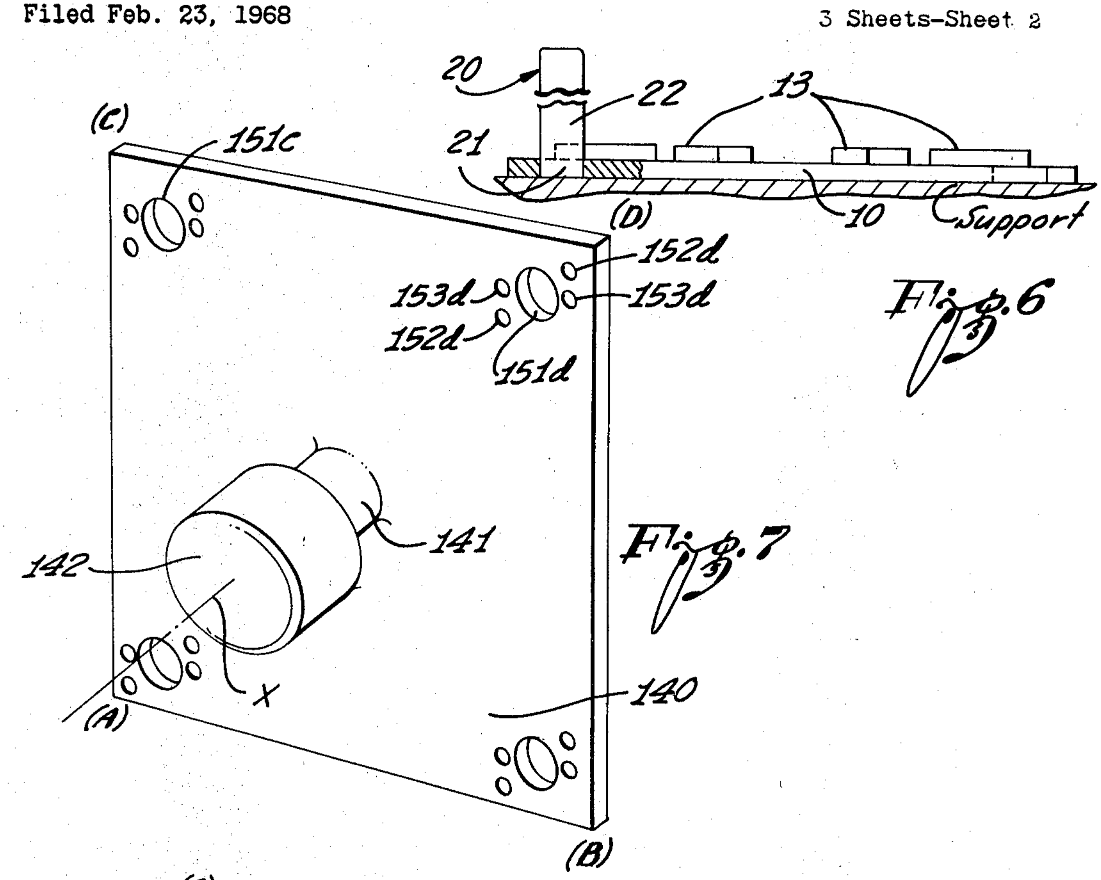
FIG. 6, FIG. 7
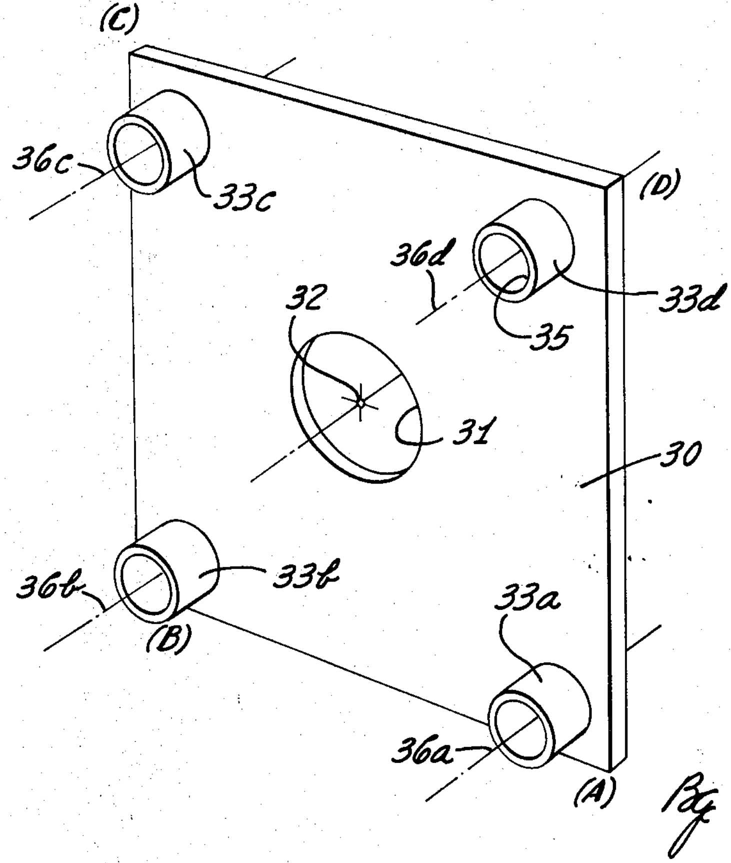
FIG. 8 (Tool)
INVENTOR:
John A. Felts
By Smyth, Roston & Pavitt
ATTORNEYS

DISK ASSEMBLY AND METHOD OF FABRICATING SAME

Filed Feb. 23, 1968

INVENTOR:
John A. Felts

ATTORNEYS

United States Patent Office 3,535,777

Patented Oct. 27, 1970

3,535,777

DISK ASSEMBLY AND METHOD OF FABRICATING SAME

John Alexander Felts, Los Angeles, Calif., assignor to Scientific Data Systems, Inc., Santa Monica, Calif., a corporation of Delaware Filed Feb. 23, 1968, Ser. No. 707,727
Int. Cl. H01f 7/05
U.S. Cl. 29—604 18 Claims

ABSTRACT OF THE DISCLOSURE

Two groups of similar, individually indexible elements are respectively indexed in relation to two tools having and defining two corresponding sets of references. The elements of one group are secured in indexed relationship to a mouning plate to which are mounted additionally transducers in indexed relation to the axes of the one tool. The other tool is positioned in particular relationship of its axes pattern to a spindle axis; the second group of elements as indexed to the second tool are secured in indexed relationship to the support structure for the spindle. The mounting plate is then positioned so that the elements of the first group is respectively indexed with those of the second group and with the second tool. The mounting plate is secured to the spindle support structure in this indexed position. The process is repeated in parts to mount additional mounting plates to the structure. The same tools can be used to assemble and index other, similar units of the same type. The accuracy of the structure is determined by the tolerances of the tools and not by the components secured to each other in the process.

The present invention relates to a method for mounting elements such as transducers in particular radial relationship to an axis pertaining, for example, to a shaft for driving recording disks; the invention further relates to a particular mounting structure establishing such a relationship, and to equipment for carrying ou such a method.

The environment in which the invention arose shall be explained briefly. In modern equipment for data processing, particularly electronic computers, large storage capacities for data are required. The different types of stores or computer memories are usually classified in terms of access time to any particular storage location at any given time. The computer memory proper is usually a relatively fast access memory in which individual items of information of the smallest order (bits) are stored in individually identifiable (addressable) storage elements (cores, flip-flops, etc.). Most particularly, the access time to any such storage element is, approximately at least, equal for all storage elements; improvements in this field have caused the access time to drop into the below-microsecond range. This type of memory is a part of the computer proper and is employed continuously during computing operations.

Other types of memory are usually regarded as memory extensions such as magnetic tape files, punched cards or the like where the access time is relatively slow. Moreover, the access time to any item of information stored in such memory extension devices is essentially unforeseeably long at any instant and depends greatly on the total amount of information stored on a tape, in a stack of cards, etc. Access time may be measured in seconds, minutes or even longer for these cases. The computer will communicate with these memory extension units during specific loading operations only whereby the transfer of data from these memory extensions to the memory proper of the computer is carried out as a preparatory step before computing can begin, or such transfer is carried out at the end of execution of a computing program, to store some or all the data used and/or the results obtained in the memory extension so that the memory computer can be used otherwise. The reason for providing these different types of stores or memories is essentially economics. The price of storage-place-per-bit is, as a general rule, the higher the faster the access time.

In the past another type of memory has been developed whereby the access time is considerably faster, on the average, as compared with access time of a tape unit or of a card file, but slower than the access time to any stored item in the memory proper of the computer. These intermediate access time or speed type storage devices are magnetic disks rotating at great speed and continuously past transducers. One revolution is the maximum period for access to any given item of information, assuming, of course, that the record tracks are circular (and not spiral) with one transducer per track, (or a pair of transducers, one for record, one for reproduce). Unlike tape units, the disk memory has a large number of parallel tracks accessible in parallel by corresponding transducers.

The development of this type of rapid access memory is primarily due to price consideration as again on a basis of a storage place-per-bit price, the disk file is considerably less expensive than a random access memory of the core or even of the flip-flop type. The average access as well as maximum access time to any given word on a disk depends only on the speed of the continuously running disk. The transfer rate of data between memory proper of the computer and the disk is high for high speeds, so that the transfer lasts considerably shorter than any data transfer between other types of memory extensions and computer. Thus, economics of such disk system permits its price to be above that of tape and other slow access units.

The disk rotates at rapid speed and cooperates with a large number of transducers each being assigned to read or write along one particular circular track only. The transducers are constructed, so that they float on an air cushion between, and in very close proximity of one of the two surfaces of the disk. It would be impractical to employ a single transducer support structure for floating above and covering the entire radial span of the disk surface used. Moreover, the tracks on the disk should be closely spaced as for reasons of signal uniformity the linear speed between a disk portion defining an inner track and one defining an outer track should not differ greatly, while on the other hand, the disk should be used to store as much information as possible (to reduce the storage space per bit price).

For reasons of crosstalk among parallelly operating transducers, the transducers must be placed farther apart from each other than the tracks can and should be spaced apart on the disk. Hence, transducers operating on juxtaposed tracks have to be azimuthally displaced, i.e., on different radii from the common center. It follows that the several transducers will be mounted on different support elements spaced apart radially as well as azimuthally. It becomes, therefore, an essential problem to position the various transducers very accurately in relation to the disk without employing a common "floating" carrier for them. The azimuthal spacing is not too critical, but the radial spacing is in order to obtain clearly identifiable and separated but closely spaced tracks without overlap.

The required degree of accuracy is so large that precision manufacturing of the various components involved for mounting the several transducers in the desired relation to the axis of the spindle for the disks would actually reduce to a considerable extent the cost advantage such type of memory has over the high access speed core memory as used in a computer. The invention now teaches the mounting of such transducers in relation to an axis in such a manner that each of the components employed may, per se, have tolerances far in excess of what would be permissible if the tolerances of the components would determine the accuracy of the final assembly. Instead, the tools employed in assembling the mounting structure are made to have these required accuracies, whereby, of course, the same tools permit repeated employment for assembling large numbers of disk units of this type. Tools and components are, in turn, designed in such a manner that the resulting head mounting structure can be made to have tolerances smaller by far than the tolerances for the components seem to permit.

One of the essential aspects of the invention is the fact that the several elements to be interconnected for establishing the desired transducer mounting construction are not provided with a plurality of precision holes, bores, recesses, flanges or the like which have to be premanufactured in a particular relation to each other at the desired degree of accuracy. In other words, there is not a single structural component (other than tooling) which has to be premanufactured in a manner that any accuracy of its elements reflects the accuracy required for positioning the transducer elements to each other and to the axis of rotation for the disk.

The principal component used for establishing the final construction is a head mounting plate to which the floating transducer support elements are to be mounted, and which in turn is mounted to the support structure of the spindle. The spindle is driven by a motor and there is a motor bulkhead or frame which is stationary and includes the support for the spindle. Essential is that on one hand the transducer support elements with the transducers will be mounted to the head mounting plate in a particular relationship to a particular axis, and the mounting plate is subsequently mounted to the spindle support structure so that that particular axis coincides with the axis of the spindle.

The mounting plate is not provided, i.e., machined, with any structure permitting directly accurate mounting of any of the transducers elements, nor can the plate by itself be mounted very accurately to any other part. The invention now suggests the utilization of an auxiliary element which is employed in the plurality and can be described rather loosely as a "movable hole" element. It is an element which can be fastened to other elements of its type, to the mounting plate or to the spindle support structure, in variable positions relative thereto. The element has a round opening defined in the plane of the opening by a very short cylindrical surface approximating a curvilinear, preferably a circular edge. The edge has to be machined accurately to some extent as a circle but not as a cylindrical wall.

The diameter of the edges of the several "movable hole" elements may vary over a range larger than the ultimately required tolerances for the assembled structure; the same holds true for the circularity, except that if a very accurately machined indexing pin is inserted under conditions providing closest fit between the cylindrical wall of the pin and the edge, the axis of such a cylinder must come close to the center of the edge within the range of ultimate tolerances required for the system. It is essential, however, that the center of the circular edge is not in any manner prepositioned to any other element. Instead, several variable hole elements are used to define accurate distances between the centers of their circular apertures (center of the circular edge), and the distances are established by indexing tools.

These "movable hole" elements cooperate with indexing pins forming part of the tooling. In particular, an indexing tool is provided to position several such indexing pins in a very accurately predetermined axis parallel relationship to each other and preferably also to a hypothetical axis, if, as is the case for mounting transducers, the mounting plate is to be positioned in relation to an axis. One or more of these "movable hole" elements are placed on the head mounting plate, and by means of the indexing pins positioned in the indexing tool the "movable hole" elements are moved and shifted on the head mounting plate until they obtain a very accurate position in relation to the indexing tool and to the hypothetical axis it defines. Then the "movable hole" elements are clamped to the mounting plate. The mounting plate becomes thereby equipped with the accurately positioned centers of the now affixed movable hole elements which centers establish points of reference for the mounting plate.

The same indexing tool can then be used to position the individual transducer mounting elements in relation to the particular, hypothetic axis. The transducer mounting elements are then secured to the head mounting plate in the respective particular indexed position for each of the transducer mounting elements. This completes the first major step in the assembling operation. The second major step requires the securing and connecting of this head mounting plate in relation to the spindle.

Generally speaking, the spindle is journaled in a bearing support which in turn forms part of the support elements, frame, bulkhead and other mounting means for the motor driving the spindle. There will thus be a suitable frame plate or bulkhead which is stationary, and which permits mounting of other structure elements in relation to the spindle. It may, for example, be assumed, without intending to restrict the invention to such a structure, that there is a motor frame plate, traversed by the spindle, supporting the bearing for the spindle and being constructed so that the transducer mounting plate can be attached thereto. This motor frame plate will now be provided with additional elements of the movable hold type. For this a second indexing tool is used to adjust the position of the movable hole elements to be attached to the frame plate.

The second indexing tool is provided with means for positioning the same (or similar) indexing pins used with the first indexing tool and in precisely the same relative position to each other. Hence, the second indexing tool is provided with means defining reference axes as, for example, center axes of cylindrical bushings integral with the second tool. The second indexing tool is then positioned in relation to the spindle axis so that the pin positioning means of the second tool obtain precisely the same position relation to the axis of the spindle as the pin positioning means for the first indexing tool have in relation to the hypothetical axis. The second indexing tool with indexing pins is used to position movable hole elements for attachment to the motor frame plate. The centers of these movable hole elements together with respectively traversing indexing pins define indexing axes parallel to the axis of the spindle. This parallelism is essential. Moreover, the axes have the same relationship to the axis of the spindle as has been established previously by the first indexing tools for those movable hole elements which were then attached to the head mounting plate in relation to the hypothetical axis to which, in turn, the individual transducers heads have been referenced. Actually, it may be advisable to use pairs of movable hole elements for each such reference axis to be established at the motor bulkhead or frame plate, one on either side of the frame plate.

Having thus prepared the motor frame plate with movable hole elements, the head mounting plate is to be positioned and mounted thereto. The pattern of reference axes as established relative to the head mounting plate by means of the movable hole elements is now brought into alignment with the axis pattern on the motor frame plate. The indexing pins respectively index the movable hole elements of the head mounting plate and the movable hole elements on the motor frame or bulkhead so that upon establishing indexing between pairs (or triplets) of movable hole elements the hypothetical axis is "carried along" with the head mounting plate and is made to coincide with the axis of the spindle.

It is thus apparent that by employment of these individual, "movable hole" elements, particularly relationships and reference points are established between mounting plates having large tolerances and tools having low tolerances. If the tools are very accurate in relation to each other, the several mounting plates obtain reference points in a highly accurate relation to each other accordingly, i.e., at an accuracy determined by the tooling and not by premanufacturing of the mounting plates. By aligning and indexing the several movable hole elements, at first in relation to tools and then, when affixed to the mounting plates, by indexing corresponding pairs of movable hole elements to each other, the head mounting plate will become positioned in a particular relationship to the axis of the spindle at tolerances determined by the tooling and not by any of the components required for securing any two parts together.

While the specification concludes with claims particularly pointing out and distinctly claiming the subject matter which is regarded as the invention, it is believed that the invention, the objects and features of the invention, and further objects, features and advantages thereof will be better understood from the following description taken in connection with the accompanying drawings in which:

FIG. 1 illustrates an elevation of a head mounting plate to which transducer heads will be mounted and which, in turn, will be mounted to the environmental structure of a spindle;

FIG. 2 shows in perspective view a movable hole element capable of defining a particular point of reference, for example, an element for the head mounting plate as shown in FIG. 1 when attached thereto;

FIG. 3 illustrates a sectional view along lines 3—3 of FIG. 2;

FIG. 4 illustrates a mounting element for a transducer head, the transducer head will be secured to the mounting element and the mounting element in turn will be secured to the head mounting plate shown in FIG. 1;

Figure 9:
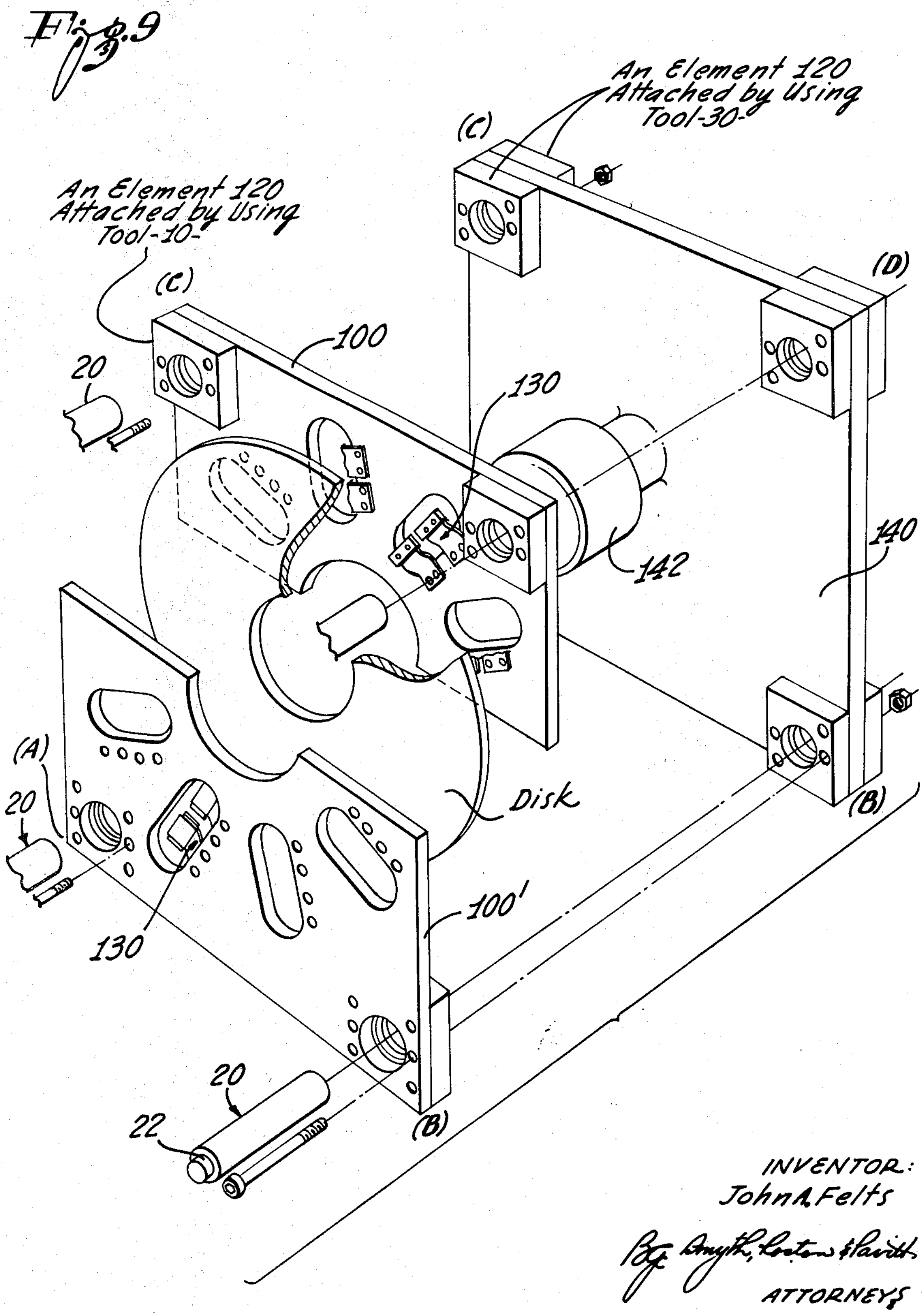

FIG. 5 illustrates in plan view and somewhat schematically the first tool, also called an interlace tool, with the aid of which two of the movable hole elements shown in FIG. 2 will be attached to a head mounting plate of the type shown in FIG. 1 and with the aid of which furthermore, a plurality of transducer head mounting elements of the type shown in FIG. 4 can be positioned in relation to the mounting plate shown in FIG. 1 for attachment thereto;

FIG. 6 shows a side elevation of the tool shown in FIG. 5;

FIG. 7 illustrates somewhat schematically in perspective view a frame plate forming a part of the stationary structure supporting the rotatable spindle in relation to which the transducer elements are to be mounted;

FIG. 8 illustrates the second tool constituting a template with the aid of which movable hole elements of the type shown in FIG. 2 are indexed in particular relationship to the axis of the spindle shown in FIG. 7, and to movable hole elements as attached to the mounting plate shown in FIG. 1; and FIG. 9 illustrates in perspective an exploded view for two transducer mounting plates as mounted to a spindle and a disk thereon.

As was outlined above, the inventive method comprises two major steps and the first major step includes the preparation of the head mounting plate for subsequently mounting same to a motor frame plate in accordance with the second major step. A representative example of the mounting plate and of elements to be mounted to the mounting plate in accordance with the first major step will be described first. In FIG. 1 there is a head mounting plate 100 having the form of a rectangle with a cutout 101 having the contour of a semicircle. The contour of this cutout 101 does not require any specific accuracy nor is it necessary that the specific center of the circle is defined. There may be, however, an average center 112 for this aperture 101 serving as a temporary point of reference merely for reasons of convenience.

A plurality of elongated slots 113 are arranged around that center 112 but again without any specific requirement for accuracy as to the orientation. Some requirements and limits for tolerances here will be developed below and follows from the tool with which plate 100 is to cooperate. The slots 113 have their predominant extension in radial direction with reference to the center 112, and are azimuthally arranged at regular angular intervals. The slots 113 are provided merely for permitting adjusting functions and operations to be carried out as will be described below; also, the slots reduce the weight of plate 100. The number of slots 113 depends on the number of transducers to be mounted to the plate. The radial length of a slot approximately equals the width of the ring-shaped portion of a magnetic disk on which tracks are to be recorded.

A plurality of threaded bores 114 are arranged along one side of each slot 113 and parallel to radial directions with reference to the center 112. The bores 114 will serve for mounting and supporting the transducer head holders, but their positions relative to the center have a tolerance far greater than permissible for the ultimate position accuracy of the transducer heads. The bores 114 along a slot 113 are arranged in pairs of constant spacing in between the two bores forming a pair, the spacing being measured in radial direction and is defined at a relative wide tolerance range.

Two corners of the mounting plate 100 are provided with groups of bores and holes. The two corners are representatively identified by the letters A or C and B or D which refer in general to the corners of a tool used for indexing plate 100. Hence, one of the corners of plate 100 may be aligned with corner A or corner C of that tool, the other one with corner B or D thereof. Upon describing the inventive method it will be assumed, quite arbitrarily, that corners C and D of the tool will be used; the several bores in the corners identified for convenience by numerals followed by the respective corner defining letter.

In each group there is, first of all, a particular, relatively large bore 111. During indexing procedures to be described below, indexing pins will traverse these bores and will be laterally shifted therein. The indexing pins, when traversing bores 111C and 111D, must then be positionable, for example, at a distance CD from center to center of the two pins. This distance is very accurately defined otherwise, not by the centers of bores 111C and 111D, and determines the ultimate accuracy of the structure when assembled. Thus, the bores 111C and 111D need to be merely sufficiently wide and positioned relative to each other to permit proper positioning of indexing pins. Obviously, the tolerances for the bores 111 can be the larger, the wider their diameter. The centers of these bores 111C and 111D will have a radial spacing from the center 112 which is a rough approximation of particular radial dimension which will be defined more fully below. Again, however, the tolerance permitted here is considerable.

Each corner of the mounting plate 100 provided with such a bore 111 has additionally three pairs of bores, respectively denoted 102, 103 and 104. The bores of the first pair 102 are arranged radially with reference to the center 112 and the bores of the second pair, 104, are arranged at right angles to the hole pair 102. The two pairs 102 and 104 of bores serve for receiving mounting bolts permitting the securing of other elements to this mounting plate 100. The bores of the third pair, 103, are arranged in between the pairs 102 and 104. The holes of the pair 103 will receive tightening bolts as will be described more fully below.

It is important that the position of a group of bores in one corner of mounting plate 100 in relation to the group in the other corner does not determine the accuracy of the ultimate position of mounting plate 100, for example, when serving as mounting elements for transducer heads in relation to the axis of rotation of a magnetic disk or disks. Each pair of bores must be accurate only to the extent that an element with a corresponding pair of bores can be secured to plate 100 without any play. The mounting plate 100 can be said as performing a dual function. Firstly, transducers will be mounted to this plate 100. Secondly, mounting plate 100 with all the transducers mounted to it will, by itself, be mounted to a frame plate of the motor which drives the spindle with a magnetic disk for cooperation with the transducers. Therefore, this mounting plate 100 must be mounted in a very accurate relationship to the axis of the spindle. Nothing in the plate 100 permits, per se, such accuracy. In particular, the groups of bores, as far as their own dimensions are concerned, their relation to each other and their relation to the center 112, do not meet the required degree of accuracy.

The required degree of accuracy with which a plate 100 can be positioned and mounted is imparted upon it and is established by using elements which can be described individually as "movable hole" element 120 (FIGS. 2 and 3). An element 120 is square-shaped or almost square-shaped in its plane of predominant extension and has cylindrical center bore 121 therein. In the interior of bore 121 there is a circular edge 125 circumscribing a center 126. The edge 125 defines a circular opening at a size which is rather accurately determined and may, for example, have a diameter within the tolerance range of 1.0002 inches to 1.0004 inches. The tolerance range for the diameter can, however, be larger than the tolerance with which the center 126 of the circle can be positioned by adjusting the position of element 120. As the circularly-shaped edge 125 with center 126 can be shifted in relation to any surface on which element 120 is placed, the position of this center 126 relative to such surface is rather undefined, but the element 120 can be indexed and secured to such a surface, and thereupon center 126 defines a reference point on the surface at an accuracy determined primarily by the accuracy with which element 120 has been positioned and indexed. The edge defines the center 126 but not an axis through the center, particularly as long as the element 120 is not mounted in relation to any other element which facilitates manufacturing of the element.

The movable hole element 120 is additionally provided with pairs of holes 123 through which bolts can be inserted for clamping the element to another part, for example, a plate 100 and in a particular position relative thereto. The element 120 is additionally provided with a pair of diagonally positioned holes 122 for receiving mounting bolts permitting the assembly of parts to which several such elements 120 have been respectively attached in an aligned relationship along a common axis traversing the respective centers 126 of the thus aligned movable hole elements 120.

The third component of importance with regard to the assembly to be established and assembled in accordance with the first main step is a transducer holder 130 shown in FIG. 4. This holder is essentially comprised of a U-shaped spring having two spring arms 131 and 132. A somewhat elongated slot 133 is provided close to the extreme end of arm 132. The bottom portion of the "U" formed by this holder spring is provided with two elongated slots 134 actually being rather wide in all directions, particularly with reference to the shank of a mounting bolt which will traverse later on the holes 134. Using such bolts a holder 130 can thus be mounted to mounting holes, particularly the bores 114 in plate 100, and in various positions relative thereto. In other words, some tolerance is permitted with regard to the position of a holder 130 relative to plate 100 as far as attachment thereto is concerned. The extreme end of the arm 131 is provided with a round and rather accurately machined bore 135.

As furthermore shown in FIG. 4 of the drawing, a transducer head mounting bar 136 will be screwed to the arms 131 and 132. The structural details of this mounting bar 136 is not important. It suffices to mention that it is, for example, a ceramic block having a plurality of slots in which respectively a plurality of very narrow transducer heads are inserted. The mounting bar 136 with transducers inserted is the principle floating element during operation of the transducers with a rotating disk. The resiliency of holder spring 130 permits this floating positioning of the transducers. The several transducer heads in a bar 136 are insulated from each other by material of the ceramic bar 136, and they are spaced from each other for a distance $\Delta R$, which is an integral multiple N of the distance from center to center of neighboring tracks on the disk. The number of transducer heads in a bar is not important for the invention. Representatively there may be nine of them.

The mounting bar 136 is provided with two bores, one thereof having a very accurate position in relation to the transducer heads. It is this one bore in bar 136 which, for purposes of mounting the head bar to the mounting spring 130, will be caused to register with the bore 135 thereof. The second threaded bore in the mounting bar 136 has to be just sufficiently accurate to permit insertion of a threaded bolt or pin through the elongated slot 133 for mounting bar 136 to spring 130. Thus, the transducer head assembly in a bar 136 is very accurately positioned relative to bore 135 when bar 136 is attached to holder 130.

As will be shown more fully below, a head mounting bar 136 when mounted to plate 100, will have a position as defined by the two bores 135 and 133 in its holder whereby the direction of alignment of the two bores is directly on a radius running through the axis of rotation of the disk with which transducers will cooperate, or on a line parallel to such radius, if the bore 135 is not axially aligned with the transducer gaps. The radial position of the head bar becomes primarily determined by the radial distance of bore 135 from this axis of rotation, and this in turn defines the radial distance of the several transducer heads in bar 136 from the center of rotation.

A misalginment of the bores 135 and 133 relative to a radius due to tolerance of bore 133 is effective only through a cosine function, so that any tolerance in the bore 133 will become effective as a misalignment of the heads in radial direction within a tolerance range which is several orders of magnitude (on a metric scale) below the tolerance for bore 133, thus amply meeting the required degree of tolerance as far as mounting of the heads in relation to the ultimate axis of rotation is concerned. Thus, the position of the transducer heads in a head bar 136 is in fact ultimately determined by the position of the bore 135 in the respective holder and in relation to the axis of rotation of the disks. The establishing of said relationship will be stepwise developed in the following.

Having described the elements to be assembled pursuant to the first major step, the tools to be employed for this major assembly step will be described next. The principal tool was referred to above as the first tool, and it can also be called an interlace tool 10, shown in FIGS. 5 and 6. The tool has a more or less square-shaped elevation with the four corners A, B, C and D and a center 12. The lower half including corners A and B will be used to index the rectangularly-shaped head mounting plates for the transducers facing the motor driving the disk and the upper half of tool 10 including corners C and D will be used for indexing a mounting plate for transducers facing away from the motor, so that both sides of a disk can be used. The interlace tool 10 has a major support plate upon which are positioned a plurality of blocks arranged around the center 12. These blocks 13 are provided with a plurality of indexing bores 15. There are twice as many bores 15 as there are transducers with mounting springs 130 mounted to a particular head mounting plate such as plate 100. Half of these bores 15 in particular will determine the position of the bores 135 of the several mounting springs 130. The respective other half of the bores 15 will index the holes 133 in the mounting springs 130 to provide radial alignment. The bores 15 can also be described as index holes, and those in a block 13 are arranged in radial alignment and at a distance from center 12 at the degree of accuracy required utimately for the mounting of the heads. The indexing holes 15 in the several blocks 13 are referenced in this manner to the same center 12. The relationship of the several heads to each other and to the center of rotation of the spindle on which the disks are mounted is thus determined by that arrangement of index bores 15.

As was mentioned above, the heads in each transducer bar 136 are spaced apart for a distance R which is an integral multiple N of the center to center distance X between neighboring tracks on a recording disk. Hence, there are, for each mounting plate 100, N-such indexing blocks 13. In the illustrated example it was presumed N=4, which is an entirely arbitrary number as far as practicing the invention is concerned and has no principle significance. Take one indexing hole 15 in a block, it may have a distance $r$ from center 12. Then there will be an indexing hole 15 in another block 13, having the distance $r+x$ or $r+\Delta R/N$ from center 12. Another indexing hole 15 in another block 13 has the distance $r+2x=r+2\Delta R/N$, etc. As stated, each index hole 15 determines the position of a hole 135 in a head mounting spring when attached to plate 100. This way the several heads in the several transducers will become staggeredly arranged, whereby particularly transducer heads cooperating with neighboring tracks are rather far from each other, due to azimuthal displacement relative to the common center. The tool 10 is actually provided with eight indexing blocks 13, but only four at a time are used for indexing operation on a mounting plate 100.

The interlace tool is additionally provided with four corner bores or recesses 11, particularly 11*a* through 11*d*, and their respective centers 16*a* through 16*d* are very accurately positioned in relation to each other, defining, for example, a square. The position of the centers 16*a* to 16*d* must be very accurately defined in relation to the center 12 to which the indexing holes 15 are referenced. Center 12 may, but does not have to, coincide with the center of the square if the centers 16*a* to 16*d* do, in fact, define a square. The essential aspect here is the existence of highly accurately determined geometric distance relations of these various centers to each other rather than the setting up of a particular geometric pattern.

The recesses 11 cooperate with indexing pins 20 which are extremely accurately machined as cylindrical pins. There exists a plurality of such pins 20. The portion of pin 20 inserted into a bore 11 of the interlace tool is denoted by reference numeral 21. The pins are machined to close tolerances so that the cylinder axis of any indexing pin 20, when inserted into a bore or recess 11 runs precisely through the respective center 16 of such a recess. Moreover, when two or more pins are inserted into the interlace tools their axes are to be precisely parallel. Parallelism is to be established within tolerances required for establishing an axis which can be made to coincide with the axis of rotation of the spindle. The direction of either indexing pin when inserted in tool 10 defines also an axis through center 12 of tool 10 which is the hypothetical axis of reference of the tool.

The diameters of the indexing portions 22 of the pins 20 may vary to some extent from bolt to bolt without, however, changing position with relation to the center axis of the pin particularly in relation to its tool-indexing portion 21. The variations of the diameter permitted for the indexing portion 22 are such that a best fit can be established between an indexing pin 20 and a circular edge 125 of a movable hole element, because the pins 20 are provided for indexing the movable hole elements as accurately as possible. In view of the fact that the edges 125 of the movable hole elements may vary in their diameter, there will be required a plurality of such indexing pins of different indexing diameter, so that for each movable hole element 120 a best suitable indexing pin can be found which passes through the aperture as defined the circular edge 125 of the movable hole element. For reasons of sufficient generality, it should be mentioned that a similar selectivity may exist with regard to the several recesses 11 and the tool indexing portion 21 of a pin to provided also best fit conditions between a particular corner recess 11 and the several indexing pins 20 to be used at that corner of the tool 10.

The first major assembly step is now carried out in the following substeps and involving a step by step mounting of several elements to the mounting plate 100. First, a mounting plate 100 is placed on one-half of the interlace tool 10, depending on the orientation the mounting plate 100 will have in relation to the spindle. This will be explained more fully below. As already mentioned above, the corners C and D of the tool will be used for indexing a mounting plate 100 to be positioned so that its corner holes 111 register with recesses 11*c* and 11*d* of tol 10. This provides that the transducers when mounted to plate 100 will later on face away from the motor driving the disk, i.e., the particular disk surface cooperating with the transducers mounted on that plate 100 will face the motor. Corners A and B of the tool will be used if the transducers on a mounting plate 100 will face the motor, i.e., if the particular disk surface faces away from the motor.

It may be assumed that corners C and D are used for describing the following indexing operation, and actually plate 100 in FIG. 1 was described above on the basis of that assumption. Upon so positioning a plate 100 on the tool four of the blocks 13 will traverse the openings 113 and at a rather wide clearance. Next, two movable hole elements 120 are respectively placed onto the mounting plate 100, and two indexing pins 20 are selected which respectively provide closest fit between their indexing portions 22 and the openings defined by the circular edges 125 of the two movable hole elements. These selected tool and index pins 20 are then inserted into the tool, recesses 11*c* and 11*d* thereof, passing, of course, through the movable hole elements. The indexing operation will require shifting of an element 120 by means of the respective index pin 20 until the index pin 20 can be inserted with its lower end 21 into the particular recess 11. Indexing may even require shifting of the entire plate 100, before this can be accomplished, which depends on the degree of accuracy with which plate 100 was initially placed onto tool 10.

Having performed this indexing operation in that manner the two pins 20 have parallel axes, and the direction of these axes defines a third axis which runs through the center 12 of tool 10 and in parallel to the two pins 120 inserted. The axes of the pins run through centers 16*c* and 16*d* in tool 10, and the three points 16*c*, 16*d* and 12 define very accurately a triangle by operation of the tool 10 as made. If the plate 100 with the two movable hole elements 120 attached, and the pins 20 inserted were removed form the tool, that center axis (initially running through tool center 12) would be "moved" with the plate 100 and becomes an integral though hypothetical axis for the plate 100, which is reproducible whenever and wherever a triangle corresponding to triangle 16*c*–16*d*–12 can be recreated and indexed relative to the pins in the movable hole elements 120. It should be noted that such an axis may not necessarily run through the center 112 of recess 101.

Having established this relationship by indexing and before the plate 100 is removed from the tool, bolts are inserted into aligned bores 123–103 and are tightened to thereby fix the positions of the two movable hole elements 120 and particularly of the two centers 126 thereof in relation to each other and to center 12 of the tool. The bores 103 in plate 100 and the bores 123 in elements 120 will in most instances not register coaxially, but they are sufficiently wide so that a bolt can transverse a bore 103 as well as a more or less aligned bore 123. The bolts for tightening may be somewhat conical to ensure fixed position of elements 120 relative to plate 100 after tightening the bolts with head screws.

In the next substep of the first major assembly step plate 100 remains in the indexed position and the several mounting springs 130 for the head bars 136 are mounted to plate 100. A plurality of mounting springs 130 are positioned on the plate 100 and the holes 134 are pairwise aligning with pairs of bores 114 in the head mounting plate. Screws or bolts may be inserted but not tightened. Now, by means of an indexing probe each mounting spring is provided with a particular position by indexing the one particular hole or aperture 135 of each mounting spring with an indexing bore 15 of the tool 10. And by way of additional indexing apertures 133 of the several elements 130 are radially aligned with the respective indexed apertures 135.

Having established these positions the screws traversing openings 134 and threadedly inserted into the threaded bores 114 are tightened. Subsequently the head bars 136 may be mounted respectively to the mounting spring 130 by screwing the respective bar 136 to arms 131 and 132 respectively of a mounting spring, using the bores 135 and 133 for inserting a respective set of threaded bolts. The head mounting operation may actually be performed at any time after the head mounting plate 100 has been removed from the interlace tool 10. The head bars 136 face away from plate 100 so that the screws for mounting a bar 136 to a spring 130 can be inserted and tightened through slots 113. After having been mounted in that manner all transducer heads are mounted at the desired degree of tolerance in relation to the hypothetical axis of plate 100 running through center 12 of tool 10, as long as the plate 100 is on the tool and indexed by pins 20. The degree of accuracy established hereby is far greater than the accuracy of the several bores 114 on plate 100 in relation to each other seems to permit.

Before proceeding to the description of the second major step in which a head mounting plate 100 provided and assembled with elements in accordance with the first major step as described above, is being mounted to the motor frame and the spindle thereof, this frame and spindle assembly shell be described first. Subsequently, a second tool used for this second major step shall be described. As shown in FIG. 7, there may be provided a motor bulkhead or frame plate 140 which is assumed to be a somewhat square-shaped plate from which a bearing support element 141 projects in cantilever fashion. The motor is on the other side of plate 140. Shaft support element 141 is traversed by a shaft (not shown) which supports a spindle 142 on which will be mounted the magnetic recording disk or disks. The detailed structure for mounting shaft, spindle and disks is not critical for the present invention. It should be mentioned, however, that a suitable spindle and shaft structure is disclosed in a separate patent application.

It is the ultimate purpose of the invention to mount and position the several transducer heads in particular relation to the axis $x$ of spindle 142. In particular, the radial position of the several transducers from axis $x$ is critical. Therefore, the head mounting plate 100 has to be positioned in relation to axis $x$ of spindle 142. Motor frame plate 140 is provided at its four corners with clearing apertures 151 which are just sufficiently wide so that indexing pins 20 having distance from each other and from the axis rotation of spindle 142. Apertures 151*c* and 151*d*, for example, must be able to receive pins 20 having position relative to axis $x$ corresponding to the above-mentioned triangle 16*c*–16*d*–12. As apertures 151 should not be required to be manufactured so that their centers exhibit this relationship, a rather wide clearing distance between the respective walls thereof and any inserted pin 20 is required. Each of these apertures 151 is flanked by two pairs of bores 153 and 152 analogous in design and function to the hole pairs 103 and 104 in a plate 100.

The second major assembly step as defined above is carried out by means of a second tool which can also be called a template fixture 30. The template fixture 30 has a central aperture 31 which is very accurately round. It may have some oval deformation establishing an ellipse whereby, however, the resulting axis of such an ellipse must be rather accurately symmetrically disposed in relation to neighboring corners of the template 30. The aperture 31 is particularly defined by a cylindrical wall which is rather smooth. The center of that aperture which is the center of a circle or the midpoint in between the two focal points of an ellipse, is noted with reference numeral 32.

Each corner of the template 30 has a bushing 33 defining a hollow cylinder provided for snugly receiving particularly the portion 21 of an indexing bolt 20. Hence, each bushing has a particular axis referred to by reference character 36 in general or 36*a*, 36*b*, 36*c* or 36*d* when related to the particular corners of the template. The axes are reference axes and defined as follows:

Each axis of a bushing is parallel to every other axis within the required degree of tolerances. Each such axis of a bushing has a distance from an axis running through the center 32 of aperture 31 in parallel to either and all of the four bushing axes. Moreover, axes 36*c* and 36*d* are related to a parallel axis through center 32 in accordance with the identical triangle relationship 16*c*, 16*d*, 12, defined by tool 10. The same holds true for the distance relationship between axes 36*a*, 36*b* and the center axis through 32 on one hand, and the triangle 16*a*, 16*b* and 12 in tool 10.

It should be mentioned at this point that the arrangement of these four bushing axes and the corresponding arrangement of these four centers 16 of the interlace tool 10 conveniently may be described as defining a square. This, however, is not essential as was mentioned above. Essential is only that triangle relationships as defined in the previous paragraph are fulfilled, but a geometrically regular pattern is not required. Thus, one of the tools, for example, the template 30, is made first at a high degree of accuracy though without necessarily attempting to produce a strictly square arrangement between the several axes. However, parallelism of the axes is essential for making the tool, so is roundness of the center bore 32. Having established very accurately bushings 36 with parallel axes in template 30, the distances between these bushings from each other and from a parallel axis through center 32 does not have to be regular to form a strict square. Having constructed the template tool 30 in this manner, however, the interlace tool 10 must be manufactured and machined so that its centers 12, the cylindrical openings 11 and their centers 16 match precisely the several axes of the template 30. Therefore, upon manufacturing the several tools parallelism of the established axes is the most critical point to be observed as far as template 30 is concerned; the interlace tool is made to match the established pattern of the several axes template whatever the pattern may be.

In summary then the template has four bushings, the axes of which are parallel to each other at a distance from a parallel axis running through center 32 of the template equal to the distance pattern established by the apertures and centers 12 and 16 in the interlace tool, so that in particular the center 32 is a duplicate of the center 12 of the interlace tool.

Template 30 is instrumental in mounting a head mounting plate 100 to motor frame plate 140 in accordance with the second major assembly step, using, however, additionally movable hole elements 120. Pursuant to the first substep of the second major assembly step template 30 is positioned so that spindle 142 and, of course, also a portion of the bearing holder 141 traverses and clears the aperture 31. The template 30 must be prepositioned here so that the axes of the several bushings are precisely parallel to the axis of spindle 141. Hence, the motor with spindle 142 must be positioned with respect to a template holder (not shown) permitting this position of the template.

Now a roundness meter is attached to spindle 142 and is caused to sweep the wall of aperture 31 in template 30. The template 30 is particularly positioned in a manner which permits its position adjustment in a plane transversely to axis *x* of spindle 142. It is preferred to have spindle 142 extend in horizontal direction so that template 30 is placed in a vertical plane. The adjustment is now carried out by shifting template 30 horizontally and/or vertically within the vertical plane, transverse to the axis of spindle 142 and until the roundness meter as attached to spindle 142 establishes through minimum eccentricity reading that within the accuracy of the roundness meter the axis of rotation *x* of the spindle traverses center 32 of aperture 31. Having accomplished this, template 30 is in a position in relation to the axis of spindle 142 so that the reference axes, through bushings **36*c* and 36*d*** will have distance from the axis of rotation *x* of the spindle 142 as centers **16*c* and 16*d* have from center 12 in tool 10**.

It will now be recalled that a particular indexing pin 20 was used to index a particular element 120 on mounting plate 100, for example, in relation to recess 11c and the center 16c thereof. The particular pin 20 was selected in accordance with the existing actual diameter of the circular edge 125 of the particular movable hole element. That particular pin will preferably be used again in corner C now of motor frame plate 140. Therefore, one will now select an element 120 whose circular edge 125 has dimensions to provide the best fit to that particular indexing pin. For the other corner D one will repeat this selection so that in this particular substep of the second main step of executing the method in accordance with the invention, particular two movable hole elements 120 will be assigned to the two respective corners C and D of plate 140.

Next, elements 120 will be placed onto the respective two indexing pins 20 which in turn are inserted into the bushings **36*c* and 36*d* with their universal fit ends 21. Thus, the respective centers 126 of these elements 120 are brought into a particular aligned position as established by bushings 36*c* and 36*d* of template 30. In particular, respective reference points 126** of the two movable hole elements will thereby assume distances from axis *x* of rotation of spindle 142 equal to the respective distances of the corner centers **16*c* and 16*d* from center 12 in interlace tool 10**.

Tightening bolts are now inserted into holes 153 of frame plate 140 as respectively, more or less, registering with holes 123 of the movable hole elements 120 so that the elements 120 are attached to the frame 140 in the indexed position as determined by template 30. It has been found useful to employ actually two movable hole elements in each corner of frame plate 140, and on each side thereof, to prevent drooping of the assembly ultimately comprising several head mounting plates all attached to one side of frame plate 140 in more or less cantilever fashion. The two indexing pins 20 are then removed from the two bushings **36*c* and 36*d* of template 30 but the template remains in position. Now, mounting plate 100 with its elements 120 attached is placed into a position so that its elements 120 can slide over the indexing pins when subsequently returned to bushings 33*c* and 33*d* as well as the moveable hole elements attached to corners C and D of plate 140. It will be apparent that thereupon the axis of rotation of spindle 142 is made to coincide with the axis to which all the transducer heads mounted on the head mounting plate 100** have been oriented. The assembly can readily be ascertained from the exploded view of FIG. 9.

After the plate 100 has been oriented in this manner and in particular relation to bulkhead or frame plate 140, tightening bolts are inserted to traverse the several essentially, but not too accurately, bores. For each corner this includes three bore pairs 122 in respective three axially aligned movable hole elements in the corner, a bore pair 152 of frame plate 140 and a bore pair 104 in plate 100. The tightening bolts are then secured by head screws to tighten and secure the entire assembly together. The first head mounting plate is thus mounted to the motor frame 140 with the following sequence of elements at each corner: movable hole—frame 140—movable hole 120—plate 100—movable hole 120 (as initially attached to plate 100). The indexing pins 20 should be removed; some auxiliary pins or bolts may be inserted instead for maintaining alignment throughout subsequent use.

Usually such a unit has more than one magnetic disk. Thus, a plurality of such head mounting plates 100 have to be mounted to the motor unit and in axial alignment, with the transducers on several plates 100, cooperating with the respective side on the several disks facing the motor. The several mounting plates 100 are prepared by the interlace tool 10 as aforedescribed using corners C and D and due to the desired relationship between the template 30 and the interlace tool 10 they can now be mounted to each other by operation of the respectively positioned corner elements 120. These elements 120 then serve also as spacers between the several head mounting plates 100. Hence, their thickness may be predetermined so that they equal the distance between the disks on spindle 142. Preferably, however, the elements 120 are made thinner so that additional spacers and shims have to be interposed to provide very accurate axial adjustment. Again, this is preferred as accuracy will be obtained by adjustment tools for such shims rather than by accurately premanufacturing the thickness of elements 120.

It has to be considered now that for each recording disk two sets of transducers are needed, one for each side, so that one needs two head mounting plates for each disk. In the description of the inventive method it has already been mentioned that only two of the four corners of each rectangularly shaped head mounting plate is used for providing a controlled position of the mounting plate. The interlace tool 10 and the template 30 each are actually two tools which are in effect being used independently; and thus could actually be so divided. The two corners A and B with their indexing recesses **11*a* and 11*b* and the indexing blocks 13 associated with them will always be used for those mounting plates for supporting the transducers cooperating with a disk surface which faces away from motor and frame 140. The other two corners C and D with the indexing recesses 11*c* and 11*d* and indexing blocks 13 are used for the assembly of mounting plates the transducers of which cooperate with a disk surface facing the motor and frame 140**. Now, the following is to be considered.

A mounting plate positioned onto the interlace tool 10 for indexing always faces up. After the support elements 130 of the transducer heads are mounted to a plate 100, the heads all appear on the upper side of the mounting plate 100 as positioned on the tool. This holds true for mounting plates 100 indexed at corners A and B as well as for those indexed at corners C and D of tool 10. However, when asssembled, the mounting plates will face opposite directions, depending on with which side of a disk the respective heads cooperate. Thus, a mounting plate asssembled by using the lower half of the tool 10 (corners A and B) and by indexing the respective movable hole elements with indexing recesses 11*a* and 11*b* the plate 100, then has to be turned around to become oriented in the assembly with the spindle oppositely as a plate 100 indexed and assembled by using recesses 11*c* and 11*d*. No further problem exists, if the triangle 16*a*–16*b*–12, and the corresponding triangle 36*a*–36*b*–32 have two similar sides, i.e., if the distances 16*a*–12 and 16*b*–12 are precisely equal. In this case, bushing 33*a* having axis 36*a* can be indexed with movable hole element which was indexed with recess 16*b*, i.e., bushing 33*a* can be used to align the movable hole in corner A of a plate 100 with a movable hole in corner B of frame 140, and bushing 33*b* having axis 36*b* then is used analogously for corner A of plate 100. These two different orientations are readily apparent from FIGS. 7 and 8. The template can thus be used without reorientation. If, however, the distance 16*a*–12 and 16*b*–12 in tool 10 and the corresponding distances 36*a*–32 and 36*b*–32 are not equal, template 30 has to be turned around likewise. In either case, the orientation is such that in relation to the first mentioned head mounting plate indexed to the recesses 11*c* and 11*d*, the corner A of the second mounting plate becomes vertically aligned with corner C of the first mentioned mounting plate and accordingly corner B of the second mounting plate is vertically aligned with the corner D of the first mounting plate.

Alternatively, the template 30 can be made so that bushing 33*a* having axis 36*a* (as shown and oriented in FIG. 8) is oriented in relation to a parallel axis through center 32 as is indexing center 16*b* in the tool 10 to center 12 thereof and analogously axis 36*b* of bushing 33*b* is oriented to a parallel axis running through the center 32 of template 30 as is center 16*a* in relation to center 12 of the interlace tool. This way then template is used in the same frontal orientation with regard to spindle 142 and frame plate 140 regardless of which type of head mounting plate is being oriented and mounted to the frame 140.

It will be apparent, that a plate 100 with movable hole elements 120 attached at corners at A and B of tool 10, when turned around causes the elements 120 to directly face the elements 120 as attached to frame 140. Thus, the plate 100 will here be spaced from frame 140 by respective two axially aligned elements 120 (plus additional spacers, if needed). A plate 100 attached at corners C and D of frame 140 was spaced therefrom only by one element 120 (at each corner). Thus, the two plates 100 carrying transducers which cooperate with different sides of a disk are axially displaced as required.

In conclusion, it can be seen that the completed assembly has an accuracy with regard to the mounting of the transducers on the several mounting plates in relation to the axis of rotation which far exceeds that obtainable at the manufacturing tolerances permissible for each individual element employed, without employment of the procedure as described, because each of the two principal mounting plates 100 and 140, is provided with accurate indexing means (elements 120), which are oriented to each other by means of several tools and thereby orient the principal mounting plates to each other at an accuracy determined by the accuracy of the indexing tools to each other.

It should be noted specifically that among the several elements employed in the final product and which remain permanently connected therewith, the circular edges 125 are the most accurately made elements. It is however, pointed out that these circular edges do not establish a cylinder or an axis but merely a centerpoint, which is simpler from a standpoint of manufacturing. Moreover, the element is to be accurate only with respect to itself as far as roundness and definition of a center is concerned. There is no accuracy required in relation to any other aperture. The only requirement for defining a plurality of mutually accurately oriented axes concerns the bushings in the template and the recesses in the interlace tool, but all these are tools and not product components.

The invention is not limited to the embodiments described above, but all changes and modifications thereof not constituting departures from the spirit and scope of the invention are intended to be covered by the following claims:

What is claimed is:

1. The method of mounting a support plate in particular relation to a particular axis, using indexable elements each capable of establishing a particular point of reference and wherein the tolerance is determined by the accuracy of a plurality of tools to each other, said method comprising the steps of:
   - positioning and indexing at least one of said elements with one of a pair of axes making use of a first tool so that the point of reference of the element when indexed is traversed by said one axis;
   - securing the element to the plate in indexed position;
   - positioning a second indexable element in relation to the particular axis and indexing the second element making use of a second tool so that the point of reference of the element runs through an axis having relationship to the particular axis as the axes of said pair have to each other;
   - positioning the one element on the plate in indexed relationship to the second element;
   - and securing the plate in a fixed position relative to the particular axis at the indexed relation as between the one and the second element.

2. The method as set forth in claim 1, including, in addition, prepositioning a plurality of transducer head mounting elements in relation to said plate;
   - indexing the mounting elements in particular relationship to said first pair of axes; and
   - securing the mounting elements to the plate in the indexed position.

3. The method as set forth in claim 1, for mounting a support plate in particular azimuthal relation to a particular axis comprising the steps of:
   - indexing two of the elements including the one element in relation to three parallel axes including said pair of axes so that the points of reference of the elements when indexed are traversed by two said axes; and
   - positioning two additional of said elements including said second element in relation to the particular axis and indexing the two additional elements so that their points of reference run through two axes having relationship to the particular axes as said three axes have to each other.

4. The method as set forth in claim 1 including the step of providing the indexed elements on the plate with axis defining means and positioning the plate with indexed element relative to the second indexable element when indexed with the axis having the relationship to the particular axis, so that the point of reference of the second indexable element is traversed by the axis of the axis defining means.

5. The method of mounting a support plate in particular relation to a particular axis using indexing elements capable of establishing a particular, definite point of reference and wherein the tolerance is determined by the accuracy of a plurality of tools to each other, said method comprising the steps of:
   - positioning and indexing at least one of said elements in relation to a pair of axes making use of a first tool, so that the point of reference of the element when indexed is traversed by said one axis;
   - securing the element to the plate in indexed position;
   - positioning the plate with element in indexed relationship of the element to a second axis having relationship to the particular axis as the axes of said pair have to each other making use of a second tool; and
   - securing the plate in a fixed position relative to the particular axis in the indexed relationship as provided by the positioning step.

6. The method as set forth in claim 5, comprising in addition, the steps of:
prepositioning a plurality of transducer mounting element on the plate;
indexing the mounting elements in particular relationship to said pair of axes; and
securing the mounting elements to the plate in the indexed position.

7. The method of mounting a support plate in particular relation to a particular axis using at least one indexable element capable of establishing a particular and definite point of reference and wherein the tolerance is determined by the accuracy of a plurality of tools to each other, said method comprising the steps of:
providing the plate with a point of reference using a first tool, said point of reference running through one of a particular pair of axes having a particular relationship to each other;
using a second tool to position an indexable element in relation to the particular axis and indexing the element so that its point of reference runs through an axis having relationship to the particular axis as the axes of said pair have to each other;
indexing the point of reference of the indexable element with the point of reference of the plate so that the points of reference in the indexed relationship are on a line parallel to the particular axis; and
securing the position of the plate in the latter indexed position.

8. The method of mounting a plurality of transducers in a particular radial relation to the axis of a spindle mounted in relation to a support, using a first tool in which index elements define a particular, axis parallel relationship between the axes of a plurality of axes including a particular axis, and in which a plurality of indexing apertures define a particular radial relation to the particular axis, and using a second tool having means defining a plurality of reference axes having said parallel relationships of axes to each other and to a center axis defined by an essentially circular aperture in the second tool, comprising the steps of:
placing a head mounting plate onto the first tool;
providing the head mounting plate with individual reference point defining means and placing the means individually in relationship with the indexing elements of the first tool when positioned in indexing positions, to define the plurality of axes except the particular axis and as axes running respectively through said reference points;
positioning transducer head mounting elements in relation to the mounting plate;
indexing the mounting elements respectively with the indexing apertures to obtain the particular radial relationship of the mounting elements to the particular axis, and securing the mounting elements to the mounting plate in the indexed position;
positioning the second tool in relation to the spindle and centering the aperture in relation to the spindle so that the center axis is essentially colinear with the axis of the spindle;
positioning a plurality of individual reference point defining elements in relation to the spindle for mounting them to the support of the spindle;
indexing the latter reference point defining elements by means of said or of comparable indexing elements in relation to the reference axes of the second tool;
indexing the reference point defining elements on said mounting plate relative to the reference axes of the second tool so that respectively pairs of reference point defining elements have their reference points coaxial with an axis of the plurality of the second tool;
and securing the mounting plate to the support in the respectively indexed positions established by the last mentioned indexing step.

9. The method of mounting a plurality of transducers in particular relation to a mounting plate using a tool in which indexing elements define a plurality of parallel axes having a particular relationship to a particular axis, and in which a plurality of indexing apertures define a particular relationship to the particular axis comprising:
placing a plate in relation to the tool;
providing the plate with a plurality of means defining individually positionable reference points;
indexing the plurality of means so that the reference points are respectively traversed by the axes of said indexing elements;
providing to the plate a plurality of transducer mounting elements;
indexing the mounting elements with the indexing apertures of the plurality; and
securing the indexed reference point defining means and the indexed mounting elements to the plate.

10. The method of mounting a plate provided with points of reference to a frame in relation to a spindle, using a tool having a plurality of means respectively defining a plurality of reference axes which are parallel to each other, further having an essentially circular aperture, comprising the steps of:
prepositioning the tool in relation to the frame;
adjusting the position of the tool so that the reference axes are parallel to the axis of the spindle and that the axis of the spindle runs through the center of said circular aperture;
providing the frame with a plurality of adjustable reference point defining means;
indexing the reference point defining means with the tool so that the reference axes of the plurality respectively traverse the reference points of the plurality of reference point defining means;
positioning the plate in relation to the frame so that respectively said reference axes traverse the reference points of the plate; and
securing the plate as positioned to the frame.

11. The method of mounting a plate in particular relation to a particular axis, using elements having an aperture for positioning the center thereof and wherein the tolerance is determined by the accuracy of a plurality of tools to each other, said method comprising the steps of:
mounting a first plurality of said elements to said plate, indexing the centers of the apertures of the elements of the first plurality in relation to a corresponding first plurality of fixed, parallel axes making use of a first tool, and securing the elements to the plate after indexing;
positioning a second plurality of said elements in relation to said axis, and indexing the centers of said elements of the second plurality in relation to a corresponding second plurality of fixed parallel axes having a relationship to each other as the axes have of the first plurality making use of a second tool;
and indexing the elements on the plate as secured thereto, to the elements of the second plurality, and providing secure relationship between all said elements and said plate.

12. The method as set forth in claim 11, the indexing including, selecting indexing pins from a plurality of pins in the tools to provide best fits in relation to the aperture of an element of the first plurality, and inserting the pins into the respective apertures for providing the indexing.

13. The method of preparing mounting plates, using elements individually establishing variable position reference points, comprising:
providing a tool having a pair of indexing recesses having a particular relationship to each other and to a particular axis;
providing the tool with a plurality of indexing holes having a particular relationship to the particular axis;
placing a mounting plate on the tool;
providing the plate with a pair of said elements and indexing their reference points to the indexing recesses;
placing a plurality of holders on the plate;
indexing the holders to the indexing holes;
and affixing elements and holders to the plate in their respective indexed position.

14. The method of affixing a mounting plate to a frame supporting a spindle and using elements individually establishing variable position reference points, comprising:
providing a tool having a cylindrical pair of indexing bores, and an aperture the center of which has a particular relationship to said bores;
positioning the tool so that the axis of the spindle runs through said center;
providing the frame with a pair of said elements;
indexing the mounting plate with the elements on the frame respectively with the indexing bores of the tool;
indexing the mounting plate with the elements on the frame as indexed with the tool; and
securing the mounting plate as indexed to the frame.

15. A method of mounting magnetic transducer heads in relation to a spindle having a particular axis to which are to be mounted magnetic disks, comprising the steps of:
positioning a head mounting plate in relation to a particular axis;
providing the plate with a plurality of means respectively defining a first plurality of axes;
positioning the means of the plurality in particular relationship of their axes to the particular axis after the last mentioned two steps;
securing subsequently the means of the plurality to the plate for arresting the positions of the first plurality of axes to the particular axis in the particular relationship;
prepositioning a plurality of transducer head mounting elements in relation to the mounting plate as positioned in relation to the particular axis;
indexing subsequently each of the elements with reference to a predetermined distance from said particular axis;
securing subsequently the elements in position;
defining a second plurality of axes in relation to the axis of the spindle to obtain a relationship of the axes the second plurality equal to the respective relationship of the first plurality of axes to the particular axes;
prepositioning subsequently a second plurality of individual, axis defining means in indexing relationship to the axes of the second plurality;
positioning the head mounting plate in relation to the spindle;
indexing subsequently respectively the axis defining means on the head mounting plate with the second plurality of axis defining means as positioned in relation to the spindle;
securing subsequently the position of the head mounting plate in the latter indexed relation; and
mounting transducer elements to the elements on the head mounting plate.

16. A construction for mounting a plurality of transducers in particular relation to a spindle having an axis, comprising:
a fixed mounting plate having a particular relationship to the spindle;
a support plate on which are mounted the transducers in particular radial relation to a particular axis;
first indexable means having an adjustable point of reference and being mounted to the support plate so that the reference point has a particular relationship to the particular axis;
second indexable means having an adjustable point of reference and being mounted to the mounting plate so that the reference point has said particular relationship to the axis of the spindle;
and means for mounting the supporting plate to the mounting plate so that the reference points of the first and second indexable means are axis parallel aligned to the axis of the spindle.

17. A method for precisely positioning a first element on a second element so that the first element is precisely located in a predetermined relationship to a third element on a fourth element, comprising the steps of:
adjusting a first set of at least two movable indexing elements on said second element so as to have a first set of axes of said elements in precise predetermined relationship to said first element;
adjusting a second set of at least two movable indexing elements on said fourth element so as to have a first set of axes of said element in precise predetermined relationship to said third element;
fastening said first and second sets of movable indexing elements to the first and third elements respectively; and
indexing and fastening said first and second set of movable indexing elements in common first axis relationship to each other.

18. The combination comprising:
first means having rotating spindle means;
second means having third means located in precise relationship to said spindle means;
locating means including first and second sets of movable alignment holes on said first and second means, respectively, for locating said third means in precise relationship to said spindle means; and
fastening means for fixing the position of said first and second movable alignment means with respect to said rotating spindle and said third means, respectively, so as to fix said third means in precise relationship to said rotating spindle, said fastening means including indexing means for aligning said first and second movable alignment means.

References Cited

UNITED STATES PATENTS

| | | | |
|---|---|---|---|
| 2,314,762 | 3/1943 | Boltz | 29—464 X |
| 3,006,443 | 10/1961 | Siler. | |
| 3,077,030 | 2/1963 | Carlson | 29—407 |
| 3,298,091 | 1/1967 | Bowman | 29—407 X |
| 3,326,726 | 6/1967 | Bassett et al. | 29—573 X |
| 3,372,455 | 3/1968 | Howe | 29—407 X |
| 3,380,149 | 4/1968 | Holbrook | 29—464 |
| 3,426,419 | 2/1969 | Banks | 29—407 |
| 3,126,776 | 3/1964 | Whistler et al. | 29—407 X |

JOHN F. CAMPBELL, Primary Examiner

D. C. REILEY, Assistant Examiner

U.S. Cl. X.R.

29—203, 407, 468